United States Patent
Iwamoto et al.

(10) Patent No.: US 8,913,873 B2
(45) Date of Patent: Dec. 16, 2014

(54) CONTENT REPRODUCTION CONTROL SYSTEM AND METHOD AND PROGRAM THEREOF

(75) Inventors: Kota Iwamoto, Tokyo (JP); Ryoma Oami, Tokyo (JP); Yuzo Senda, Tokyo (JP); Takahiro Kimoto, Tokyo (JP); Takami Sato, Tokyo (JP); Yasufumi Hirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 13/001,398

(22) PCT Filed: Jun. 22, 2009

(86) PCT No.: PCT/JP2009/061306
§ 371 (c)(1),
(2), (4) Date: Feb. 2, 2011

(87) PCT Pub. No.: WO2009/157402
PCT Pub. Date: Dec. 30, 2009

(65) Prior Publication Data
US 2011/0123171 A1   May 26, 2011

(30) Foreign Application Priority Data
Jun. 26, 2008 (JP) ................................ 2008-167342

(51) Int. Cl.
*H04N 9/80* (2006.01)
*H04N 5/93* (2006.01)
(Continued)

(52) U.S. Cl.
CPC .................. *G11B 27/28* (2013.01); *H04N 5/76* (2013.01); *G11B 27/034* (2013.01);
(Continued)

(58) Field of Classification Search
USPC ................................................. 386/239–262
See application file for complete search history.

(56) References Cited

U.S. PATENT DOCUMENTS

| 6,816,551 B1 | 11/2004 | Kasutani |
| 6,870,957 B1 | 3/2005 | Kasutani |

(Continued)

FOREIGN PATENT DOCUMENTS

| EP | 1 827 018 A1 | 8/2007 |
| JP | 2000-259832 A | 9/2000 |

(Continued)

OTHER PUBLICATIONS

European Search Report dated Jun. 28, 2011, for EP 09 77 0112.
(Continued)

*Primary Examiner* — Hung Dang
(74) *Attorney, Agent, or Firm* — McGinn IP Law Group, PLLC (57) ABSTRACT

Provided is a content reproduction control system equipped with: a signal characterizing quantity sequence extraction means that, for each content item stored in a content group storage unit that stores at least more than one content item, extracts a signal characterizing quantity sequence which is the sequence of the signal characterizing quantities associated with the content positions on the time axis; a common section group detection means that detects, as a common section group in the signal characterizing quantity sequence for each content item, a common section group for which the signal characterizing quantities for different content items are similar to each other; a content reproduction quality information collection means that, for each common section group, collects content reproduction quality information which indicates the reproduction quality of the content to which each common section of a common section group belongs; and a content reproduction control means that, when the content contained in the content group storage unit is reproduced, switches the content reproduced for the content to be reproduced for the sections included in the common section group and performs reproduction such that the reproduction quality of the content will be higher, based on the content reproduction quality information for the content to which each common section of a common section group belongs.

19 Claims, 3 Drawing Sheets

(51) Int. Cl.
  *H04N 5/76*      (2006.01)
  *G11B 27/034*    (2006.01)
  *G11B 27/28*     (2006.01)
  *H04N 21/432*    (2011.01)
  *H04N 19/30*     (2014.01)
  *H04N 21/44*     (2011.01)
  *G11B 27/32*     (2006.01)

(52) U.S. Cl.
  CPC .... *H04N 21/4325* (2013.01); *H04N 19/00424* (2013.01); *H04N 21/44008* (2013.01); *G11B 27/329* (2013.01)
  USPC .......................... 386/248; 386/239; 386/353

(56) References Cited

U.S. PATENT DOCUMENTS

| | | | |
|---|---|---|---|
| 2003/0093790 A1* | 5/2003 | Logan et al. | 725/38 |
| 2003/0121053 A1* | 6/2003 | Honda | 725/107 |
| 2003/0185455 A1* | 10/2003 | Goertzen | 382/240 |
| 2004/0001160 A1 | 1/2004 | Herley | |
| 2004/0001161 A1 | 1/2004 | Herley | |
| 2005/0111542 A1 | 5/2005 | Hattori | |
| 2007/0024706 A1* | 2/2007 | Brannon et al. | 348/142 |
| 2007/0261092 A1 | 11/2007 | Ozawa et al. | |
| 2008/0205788 A1 | 8/2008 | Hattori | |

FOREIGN PATENT DOCUMENTS

| | | |
|---|---|---|
| JP | 2000-339474 A | 12/2000 |
| JP | 2003-333484 A | 11/2003 |
| JP | 2005-159419 A | 6/2005 |
| JP | 2006-515721 T | 6/2006 |
| JP | 2007-295038 A | 11/2007 |
| WO | WO 2004/004351 A1 | 1/2004 |

OTHER PUBLICATIONS

Eiji Kasutani, et al, "Video Material Archive System for Efficient Video Editing based on Media Identification", Proceedings on International Conference on Multimedia and Expo (ICME 2004), vol. 1, pp. 727-730, Jun. 2004.

Nishimura Takuichi, et al., "Same Interval Retrieval from Time-Sequence Data Based on Active Search: Reference Interval-Free Time: Series Active Search (RIFAS)," The Transactions of the Institute of Electronics, Information and Communication Engineers, D-II, vol. J84-D-II, No. 8, pp. 1826-1837, Aug. 2001.

* cited by examiner

CONTENT REPRODUCTION CONTROL SYSTEM AND METHOD AND PROGRAM THEREOF

TECHNICAL FIELD

The present invention relates to a content reproduction control system, and a method and a program thereof.

BACKGROUND ART

The present invention targets systems and apparatuses in which contents are reproduced/perused with a large volume of the contents as a target. Additionally, herein, the so-called content is a content having a time axis including a video content that is comprised of video/audio signals such as a CGM (Consumer Generated Media) content, a home video, a television program and a movie, and an audio content that is comprised of audio signals such as music.

As a system in which contents are reproduced/perused with a large volume of the contents as a target, there exists, for example, a video sharing service (video hosting site) on Internet. The video sharing service (video hosting site) is a site in which a general user can upload the video contents into a server and a large number of the users can reproduce/peruse the uploaded video contents.

Further, there also exists the service (site) in which the user can cross-search the video contents of a plurality of different video sharing services (video hosting sites) to reproduce/peruse these video contents. Further, there also exists the video search service (video search site) in which the user can search and reproduce/peruse the video contents with all of the video contents on Internet as a target. In these services (sites), the user reproduces/peruses the video contents without being aware of physical locations of the video contents (also when, as a matter of fact, the video contents are dispersed to a plurality of different servers).

It is characteristic of such a video sharing service (video hosting site) on Internet that the contents each having identical details or the contents in which the sections are partially identical to each other exist in a plural number. The reason is that the topical videos are uploaded by the different users in some cases and the videos are uploaded into the different video sharing services (video hosting sites) in some cases. At this moment, converting the contents, each of which has identical details, into the contents each having a different video format or data size (bit rate) causes the contents each having a different quality to exist. Further, the contents that are identical to each other in only one part of the section exist because one part of the section is extracted and edited.

Additionally, there also exist the content sharing service (content hosting site) on Internet that targets not only the video contents but also the music contents (audio contents) as the content sharing service (content hosting site) mentioned above. Further, there also exists the video sharing service utilizing P2P (peer-to-peer) communication besides such a form of a website by the server.

SUMMARY OF INVENTION

Technical Problem

The system in which contents are reproduced/perused with a large volume of the contents as a target, for example, the video sharing service (video hosting site) on Internet, however, causes a problem that the user results in viewing the content of which the reproduction quality is poor because there are many contents of which the reproduction quality is poor. The user has to resignedly put up with viewing of the contents of which the reproduction quality is poor because the reproduction quality cannot be secured.

Herein, the so-called content of which the reproduction quality is poor is a content of which the quality of the reproduced signals such as an image quality/sound quality is poor, a content of which the reproduction is delayed (a content of which a start of the reproduction is delayed, a content of which the reproduction is interrupted, or the like), or the like. These contents of which the reproduction quality is poor are hard for the user to view.

As this factor, there exist the factor due to the content itself and the factor due to a quality (a network quality) of a network intervening between a location of the content and a user's reproduction environment.

For example, the content of which the data size is small and the content of which the bit rate is low, which are caused by the content itself, becomes a content of which the signal quality such as the image quality and the sound quality is poor, respectively (for example, a content having severe block noises generated). Further, the content generated by employing a compression technique having poor coding efficiency becomes a content of which the signal quality such as the image quality and the sound quality is poor. A limitation to the data size of the video content to be uploaded is often imposed in the video sharing service (video hosting site) on Internet or the like, whereby a large number of the contents of which the signal quality such as the image quality and the sound quality is poor are inevitably generated. Further, a decline in the signal quality such as the image quality and the sound quality occurs at a stage of the recording (capturing) scheme in the content generated by copying the original content with a recording (capturing) scheme or the like, and resultantly the contents of which the image quality and the sound quality (signal quality) is poor are produced. In this case, there is also the case that the signal quality such as the image quality and the sound quality largely declines only in one part of the content. There are many contents generated by copying the content with such a recording (capturing) scheme or the like in the video sharing service (video hosting site) on Internet or the like.

As a content having a poor reproduction quality caused by a quality (a network quality) of the network intervening between the location of the content and the user's reproduction environment, for example, when a band of the network is narrow and a traffic amount of the network is much in the network between the server in which the contents exist and a user's terminal, a delay occurs in the reproduction (it takes a long time to start the reproduction, the reproduction is interrupted, and the like) and a processing delay (a drop frame etc.) occurs, and resultantly, the contents of which the reproduction quality is poor are produced. The problems such as the reproduction delay and the processing delay often occur in the video sharing service (video hosting site) on Internet or the like because the above server stores a large volume of the video contents and accesses hereto are concentrated in many cases.

When an instruction for reproducing a certain content is given by the user, in a case where the reproduction quality of the above content is poor (that is, in a case where the signal quality of the content itself, and the quality of the network between the location of the content and the user's reproduction environment is poor), the user results in viewing the content of which reproduction quality is poor, and has to resignedly put up with viewing of the contents of which the reproduction quality is poor.

Thereupon, the present invention has been accomplished in consideration of the above-mentioned problems, and an object thereof is to provide a content reproduction control system for, when reproducing/perusing the contents, realizing the reproduction in which the reproduction quality of the content is secured (a high reproduction quality), and a method and a program thereof.

Solution to Problem

The present invention for solving the above-mentioned problems is a content reproduction control system, comprising: a content group storage unit for storing at least one content or more; a signal feature series extraction means for, for each content stored in said content group storage unit, extracting a signal feature series, being a series of signal features caused to correspond to positions on a time axis of the content; a common section group detection means for detecting a group of common sections, being sections in which the signal features for different contents are similar to each other, from said signal feature series for each content as a common section group; a content reproduction quality information obtaining means for, for said each common section group, obtaining content reproduction quality information representing a reproduction quality of the content to which each common section of the common section group belongs; and a content reproduction control means for, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The present invention for solving the above-mentioned problems is a content reproduction control apparatus, comprising: a signal feature series extraction means for, for each content stored in a content group storage unit for storing at least one content or more, extracting a signal feature series, being a series of signal features caused to correspond to positions on a time axis of the content; a common section group detection means for detecting a group of common sections, being sections in which the signal features for different contents are similar to each other, from said signal feature series for each content as a common section group; a content reproduction quality information obtaining means for, for said each common section group, obtaining content reproduction quality information representing a reproduction quality of the content to which each common section of the common section group belongs; and a content reproduction control means for, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The present invention for solving the above-mentioned problems is a content reproduction control method, comprising: a signal feature series extraction step of, for each content stored in a content group storage unit for storing at least one content or more, extracting a signal feature series, being a series of signal features caused to correspond to positions on a time axis of the content; a common section group detection step of detecting a group of common sections, being sections in which the signal features for different contents are similar to each other, from said signal feature series for each content as a common section group; a content reproduction quality information obtaining step of, for said each common section group, obtaining content reproduction quality information representing a reproduction quality of the content to which each common section of the common section group belongs; and a content reproduction control step of, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The present invention for solving the above-mentioned problems is a content reproduction control program for causing an information processing apparatus to execute: a signal feature series extraction process of, for each content stored in a content group storage unit for storing at least one content or more, extracting a signal feature series, being a series of signal features caused to correspond to positions on a time axis of the content; a common section group detection process of detecting a group of common sections, being sections in which the signal features for different contents are similar to each other, from said signal feature series for each content as a common section group; a content reproduction quality information obtaining process of, for said each common section group, obtaining content reproduction quality information representing a reproduction quality of the content to which each common section of the common section group belongs; and a content reproduction control process of, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

Advantageous Effect of Invention

The present invention is capable of realizing the reproduction in which the reproduction quality of the content is secured (a high reproduction quality) when reproducing/perusing the contents.

REFERENCE SIGNS LIST 1 content group storage unit
2 signal feature series extraction means
3 common section group detection means
4 content reproduction quality information obtaining means
5 content reproduction control means

DESCRIPTION OF EMBODIMENT

Figure 1:
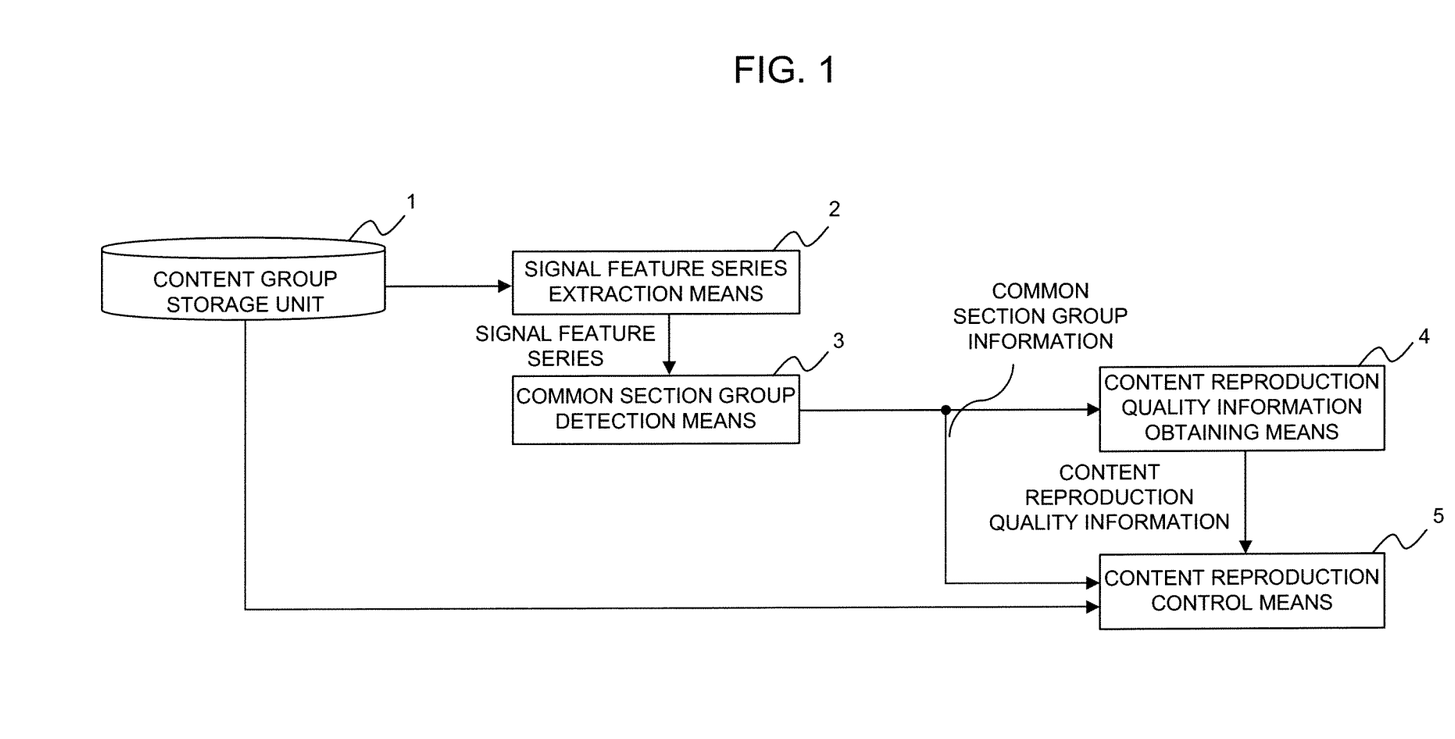
FIG. 1 is a block diagram illustrating a configuration of this exemplary embodiment.

Next, the exemplary embodiment of the present invention will be explained in details by making a reference to the accompanied drawings. FIG. 1 is a block diagram illustrating a configuration of the content reproduction control system related to this exemplary embodiment. Upon making a reference to FIG. 1, the exemplary embodiment of the present invention is configured of a content group storage unit 1, a signal feature series extraction means 2, a common section group detection means 3, a content reproduction quality information obtaining means 4, and a content reproduction control means 5.

The content group storage unit 1 stores a plurality of the contents.

Herein, the so-called content is a media having the time axis that is comprised of the video signals or the audio signals, or both of the video signals and the audio signals, and for example, a CGM (Consumer Generated Media) content, a home video, a television program, a movie, a music content or the like, and the content is not limited hereto.

The content group storage unit 1 stores a population of the contents, being a target for performing the reproduction control for the contents by the present invention. While the content group storage unit 1 is mentioned for convenience in such a manner that the contents are stored in one location, needless to say, the contents may be dispersed to a plurality of the storages and stored. The content group storage unit 1 is, for example, a storage etc. of the video sharing service (video hosting site) on Internet in which the video contents are stored. At this moment, the storages of the video sharing service (video hosting site) may be dispersed in a plural number. Further, the content group storage unit 1 could be, for example, a storage of a plurality of the video sharing services (video hosting sites) on Internet. Further, the content group storage unit 1 could be, for example, all of the storages having all of the contents stored that dispersedly exist on Internet.

The signal feature series extraction means 2, for each content stored in the content group storage unit 1, extracts a signal feature series, being a series of the signal features caused to correspond to positions on a time axis of the content (for example, a media time etc.). The signal feature series extraction means 2 supplies the extracted signal feature series for each content to the common section group detection means 3.

Herein, the so-called signal feature is a feature representing the video signals to be included in the content, a feature representing the audio signals to be included in the content, or a feature obtained by combining them.

Herein, for example, image features (visual features) are extracted from images of each frame of the content and used as a series of the signal features representing the video signals. In this case, the signal feature series is caused to correspond to positions on the time axis of the content by use of the frame number caused to correspond to the frame, or the media time of the frame to be calculated based upon it. As the image feature, for example, the feature representing luminance information, the feature representing color information, the feature representing edge information, the feature representing texture information, the feature representing shape information, the feature representing motion information, or the like can be used. Further, dominant color, color layout, scalable color, color structure, edge histogram, homogeneous texture, texture browsing, region shape, contour shape, shape 3D, parametric motion, or motion activity defined by International Standards ISO/IEC 15938-3 may be used, for example.

Alternatively, instead of extracting the image feature from each frame of the content, the image feature may be extracted from only the frames selected at arbitrary sampling intervals, for example. Alternatively, for example, the process such as a cut detection process (a process of detecting a changeover of the video) may be performed to select specific frames, and the image features may be extracted only from the selected frames. Further, alternatively, the content may be divided into sections each having an arbitrary time length, and the image feature of each of a plurality of the frames to be included in each section may be extracted from the section, so that the image features may be consolidated and used. The image features may be consolidated, for example, by determining an average value, a median value, a most frequent value, or a histogram. Further, alternatively, the image features may be extracted only from the pre-specified positions on the specific time axis of the content, for example. Also in these cases, the image features are caused to correspond to the positions on the time axis of the content by use of the frame number caused to correspond to the frame or the section, or the media time to be calculated based upon it.

An arbitrary number of sampling sections in which continuous digital audio signals (audio waveforms) exist (hereinafter, referred to an audio frame) may be analyzed, extracted, and used as a series of the signal features representing the audio signals. For example, by performing a frequency transform such as a Fourier transform for such audio frames and extracting the spectra thereof, an average power of the spectra, an average power for each frequency range, spectrum flatness, spectrum flatness for each frequency range, or the like may be extracted as a signal feature series representing the audio signals. In this case, the signal feature series is caused to correspond to the positions on the time axis of the content by use of the number of the sample point of each audio frame, or the media time to be calculated based upon it. Alternatively, for example, the signal feature series representing the audio signals may be extracted only from the pre-specified positions on the specific time axis of the content.

Additionally, the signal features that the signal feature series extraction means 1 extracts are not limited to the above-mentioned signal features. An arbitrary signal feature may be used so long as the feature represents a video signal to be included in the content, an audio signal to be included in the content, or a combination thereof.

The common section group detection means 3 detects a group of the common sections, being sections in which the signal features for different contents are similar to each other, from the signal feature series for each content that are supplied from the signal feature series extraction means 2 as a common section group. The common section group detection means 3 supplies information of the detected common section group, namely, information for specifying the content to which each common section of the common section group belongs and the position on the time axis as common section group information to the content reproduction quality information obtaining means 4 and the content reproduction control means 5.

As a method of detecting the common section group, being sections in which the signal features are similar to each other, from the signal feature series for each content, for example, the methods of Literature 1 (Eiji Kasutani, Ryoma Oami, Akio Yamada, Takami Sato, and Kyoji Hirata, "Video Material Archive System for Efficient Video Editing based on Media Identification", Proceedings on International Conference on Multimedia and Expo (ICME 2004), Vol. 1, pp. 727-730, June 2004.), literature 2 (NISHIMURA Takuichi, MIZUNO Michinao, OGI Shinobu, SEKIMOTO Nobuhiro, and OKA Ryuichi "Same Interval Retrieval from Time-Sequence Data Based on Active Search: Reference Interval-Free Time: Series Active Search (RIFAS)," The Transactions of the Institute of Electronics, Information and Communication Engineers, D-II, Vol. J84-D-II, No. 8, pp. 1826-1837, August 2001), and Literature 3 (Laid-Open of PCT translation No. 2006-515721) can be employed.

For example, the method of detecting the sections in which the signal features are similar to each other from the signal feature series of the video signals is described in the literature 1. According to the method of the Literature 1, firstly, the section having a short time length is extracted as a query section (reference section) from the signal feature series. From the remaining sections of the signal feature series (in this-time case, for the different contents), the sections each having the same time length as the query section are sequentially extracted along the time axis, and a similarity to the query section is calculated. An average value of the similarities of the image features among frames corresponding to the sections is used for calculating the similarity. For the sections having a high similarity to the query section, the sections for which the similarity is calculated are extended in negative and positive directions of the time axis, and the start and end points of the sections in which the signal features are similar to each other are determined. When this processing is completed for a certain query section, the next query section is extracted, and the same processing is repeated. In such a manner, the sections in which the signal features are similar to each other can be detected. Additionally, besides the signal feature series of the video signals, the method described in the Literature 1 can be similarly applied to the signal feature series representing the audio signals. Additionally, when detecting sections in which the signal features are similar to each other, the level of the similarity of the signal features to be detected as similar sections can be arbitrarily determined. Thus, for example, a configuration can be made so that the signal features are regarded to be similar to each other also when the noise such as background sound is mixed in the case that the image has been subjected to the localized processing such as insertion of telop.

Figure 2:
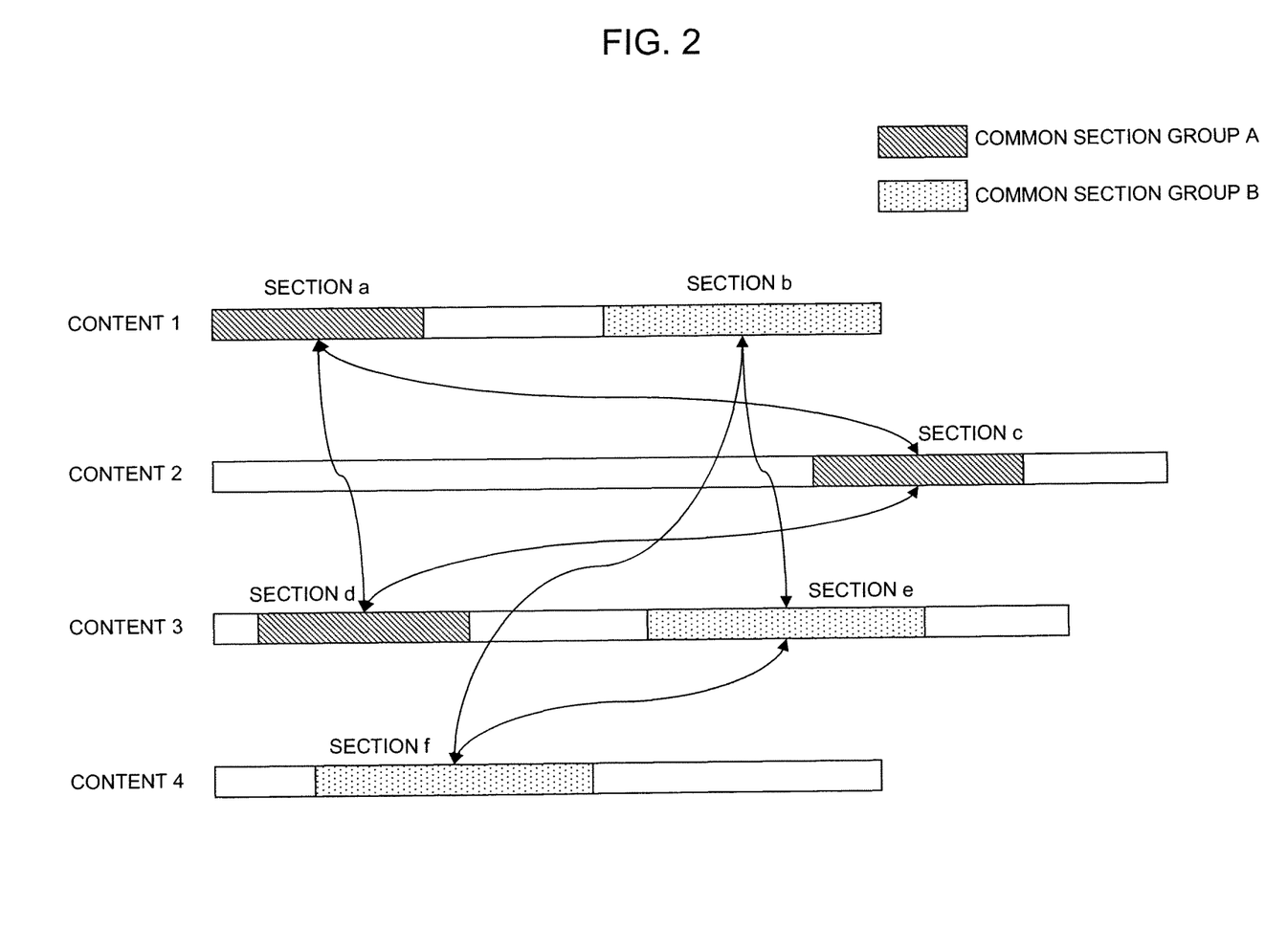
FIG. 2 is a view illustrating an example of the common section group.

Upon making a reference to FIG. 2, an example of detecting the common section group is shown (in FIG. 2, the arrow represents that the sections are included in the identical common section group). FIG. 2 shows an example in which two common section groups, namely a common section group A and a common section group B are detected for four contents of a content 1 to content 4. The common section group A is configured of three common sections of a section a of the content 1, a section c of the content 2, and a section d of the content 3. The common section group information for the common section group A could be information for specifying the three common sections of the section a of the content 1, the section c of the content 2, and the section d of the content 3, for example, information of the media time of a start point and an end point of each section, a frame number, etc. Further, the common section group B is configured of three common sections of a section b of the content 1, a section e of the content 3, and a section f of the content 4. The common section group information for the common section group B could be information for specifying the three common sections of the section b of the content 1, the section e of the content 3, and the section f of the content 4, for example, information of the media time of a start point and an end point of each section, a frame number, etc.

The content reproduction quality information obtaining means 4 obtains content reproduction quality information representing a reproduction quality of the content to which each common section of the common section group belongs based upon the common section group information to be supplied from the common section group detection means 3. The content reproduction quality information obtaining means 4 supplies the obtained content reproduction quality information to the content reproduction control means 5.

Additionally, the method in which the content reproduction quality information obtaining means 4 obtains the content reproduction quality information is arbitrary. The content reproduction quality information obtaining means 4 may obtain the content reproduction quality information from the content itself to be included in the content group storage unit 1, and may obtain it from outside's information.

Upon making a reference to FIG. 2 for explanation, the content reproduction quality information obtaining means 4, for the common section group A and the common section group B, obtains the content reproduction quality information of the content to which each common section to be included in these common section groups belongs. The content reproduction quality information obtaining means 4, for the common section group A, obtains the content reproduction quality information of the content 1 to which the section a to be included in it belongs, the content 2 to which the section c belongs, and the content 3 to which the section d belongs. The content reproduction quality information obtaining means 4, for the common section group B, obtains the content reproduction quality information of the content 1 to which the section b to be included in it belongs, the content 3 to which the section e belongs, and the content 4 to which the section f belongs.

Further, instead of the information representing the reproduction quality of an entirety of the contents to which respective common sections of the common section group belong, the content reproduction quality information obtaining means 4 may obtain information representing the reproduction quality of each common section. In an example of FIG. 2, instead of the information representing the reproduction quality of an entirety of the contents of the content 1, the content 2, the content 3, and the content 4, the content reproduction quality information obtaining means 4 may obtain information representing the reproduction quality of the section a, the section b, the section c, the section e, and the section f, being common sections of respective contents.

Herein, the so-called content reproduction quality information representing the reproduction quality of the content is, for example, information representing the signal quality such as the image quality and the sound quality of the content, or the like.

The information representing the signal quality such as the image quality and the sound quality of the content is, for example, information such as a bit rate (a bit rate for a coding scheme), a resolution, a frame rate, and a coding scheme of the content. As a rule, it can be determined that the signal quality such as the image quality and the sound quality is high all the more as the bit rate is higher, the resolution is higher, the frame rate is higher, and the coding efficient of the coding scheme is more excellent. These items of the information can be obtained from the content itself (header information of the content or the like). In this case, the content reproduction quality information obtaining means 4 may obtain the information such as the bit rate and the coding scheme from the content itself stored in the content group storage unit 1. Further, instead of obtaining the information such as the bit rate, the resolution, the frame rate, and the coding scheme of the content from the content itself stored in the content group storage unit 1, the content reproduction quality information obtaining means 4 may obtain the above information from metadata information caused to correspond to these contents.

Further, the content reproduction quality information obtaining means 4 may analyze the content itself to extract the information representing the signal quality such as the image quality and the sound quality of the content. In this case, the content reproduction quality information obtaining means 4 analyzes the content itself stored in the content group storage unit 1, and extracts the information representing the signal quality such as the image quality and the sound quality of the content. For example, the content reproduction quality information obtaining means 4 may calculate magnitude of the coding noise by analyzing the image quality of the image that can be obtained by decoding the content, and regards its calculation result as information representing the image quality. In this case, it can be determined that the image quality is high all the more as the coding noise is smaller.

For example, employing the method of Literature 4 (JP 2005-159419A "APPARATUS AND METHOD OF PROCESSING IMAGE, COMPUTER PROGRAM AND COMPUTER-READABLE STORAGE MEDIUM") makes it possible to quantify the coding noise. Needless to say, the method of measuring the coding noise is not limited hereto, and an arbitrary method capable of determining the image quality by employing the image quality that can be obtained by decoding the content may be used. Further, the matter to be used for measuring the coding noise is not limited to the image quality, and the situation is similar with the sound quality.

These items of the content reproduction quality information representing the signal quality such as the image quality and the sound quality can also obtained for each common section to be included in the common section group.

Further, a quality evaluation value may be calculated with the method obtained by combining the methods of obtaining the signal quality such as the image quality and the sound quality of the content, which have been listed above, to regard its calculation result as the content reproduction quality information representing the signal quality such as the image quality and the sound quality of the content.

Further, herein, the so-called the content reproduction quality information representing the reproduction quality of the content is, for example, a quality (a network quality) of the network intervening between the location of the content and the user's reproduction environment, or the like. The network quality differs content by content because the network intervening between the location of the content and the user's reproduction environment differs when the location of the content differs (for example, when the storage for storing the contents differs).

The network quality is, for example, a communication band, a communication delay, a packet loss rate, a traffic amount and the like of the network intervening between the location (storage) of the content and the user's reproduction environment (user's viewing terminal). As a rule, it can be determined that the reproduction quality of the content is high all the more as the communication band is wider, the communication delay is smaller, the packet loss rate is lower, and the traffic amount is smaller because the reproduction delay of the content (it takes a long time to start the reproduction, the reproduction is interrupted, and the like) and the processing delay (drop frame) hardly occurs. In addition hereto, the access amount etc. as well to the server having the contents stored may be obtained as the content reproduction quality information. These items of the information can be obtained, for example, by accessing to the server having the contents stored, and measuring these items of data. In this case, the content reproduction quality information obtaining means 4 may obtain the above information, for example, by accessing to the content group storage unit 1 and measuring these items of data. Further, the content reproduction quality information obtaining means 4 may obtain the information such as the communication band, the communication delay, the packet loss rate, the traffic amount, and the access amount as information to be inputted from the outside. The content reproduction quality information obtaining means 4 may obtain the above information from the outside's information such as the statistics calculated from the data measured in the past.

Further, the content reproduction quality information obtaining means 4 may obtain, for example, statistics data such as an occurrence rate of the reproduction delay of the content and a content reproduction delay time as the content reproduction quality information. These items of the information can be calculated, for example, from the occurrence rate of the reproduction delay and the reproduction delay time measured in the past.

Herein, as a method of obtaining the network quality, the publicly-known various methods of evaluating the network quality may be utilized.

The content reproduction quality information listed herein is one example, and the content reproduction quality information is not limited hereto. Arbitrary information may be used so long as it enables all of the reproduction qualities of the contents (quality that the user feels when viewing the content) to be judged.

The content reproduction control means 5, when reproducing the contents to be included in the content group storage unit 1, switches the content to be reproduced so that the reproduction quality of the content becomes higher based upon the content reproduction quality information of the content to which each common section of the common section group belongs, for the sections to be included in the common section group in the to-be-reproduced content by employing the common section group information to be supplied from the common section group detection means 3, and the content reproduction quality information to be supplied from the content reproduction quality information obtaining means 4, and reproduces the content.

As a method of switching the content to be reproduced so that the reproduction quality of the content becomes higher, and reproducing the content, the content reproduction control means 5 may select the content of which the reproduction quality becomes highest based upon the content reproduction quality information of the content to which each common section of the common section group belongs, make a switchover to the selected content, and reproduce the content.

A reference to FIG. 2 is made for explanation. Herein, a content 1 is defined to be the to-be-reproduced content. The section to be included in the common section group in the content 1 is the section a to be included in the common section group A, and the section b to be included in the common section group B. Herein, for example, based upon the content reproduction quality information, when the content 3 including the section d, out of the contents to which respective common sections of the common section group A belong, and the content 4 including the section f, out of the contents to which respective common sections of the common section group B belong, are contents of which the content reproduction quality becomes highest, the content reproduction control means 5 reproduces the content in the following manner when reproducing the content 1, being the to-be-reproduced content. That is, the content reproduction control means 5, firstly when reproducing the section a, alternatively makes a switchover to the section d of the content 3, and reproduces the content, next when reproducing the section not to be included in the common section group (the section between the section a and the section b), reproduces the content 1 as it stands, and finally when reproducing the section b, alternatively makes a switchover to the section f of the content 4, and reproduces the content. Needless to say, for example, when the content 1, being the to-be-reproduced content, out of the contents to which respective common sections of the common section group belong, is a content of which the content reproduction quality becomes highest, the content reproduction control means 5 may reproduce the content 1 as it stands without especially switching the content.

Herein, for example, when the content reproduction quality information represents the signal quality such as the image quality and the sound quality of the content, the content reproduction control means 5 may select the content of which the content signal quality becomes highest for each common section group, make a switchover to the selected content, and reproduce the content. For example, the content reproduction control means 5 may select the content of which the bit rate is highest, the content of which the resolution is highest, the content of which the frame rate is highest, the content encoded with the coding scheme having highest coding efficiency, and the content of which the coding noise is smallest, make a switchover to the selected content, and reproduce the content.

Herein, for example, when the content reproduction quality information represents the quality (network quality) of the network intervening between the location of the content and the user's reproduction environment, the content reproduction control means 5 may select the content of which the network quality becomes highest for each common section group, make a switchover to the selected content, and reproduce the content. The network quality differs content by content because the network intervening between the location of each content and the user' reproduction environment differs when the contents dispersedly exist in a plurality of the storages (locations). For example, the content reproduction control means 5 may select the content of which the communication band of the network intervening between the location of the content and the user's reproduction environment is widest, the content of which the communication delay thereof is smallest, the content of which the packet loss rate thereof is lowest, and the content of which the traffic amount thereof is smallest, make a switchover to the selected content, and reproduce the content. Further, for example, the content reproduction control means 5 may select the content of which the access amount to the server in which the content exists is smallest, make a switchover to the selected content, and reproduce the content. Further, for example, the content reproduction control means 5 may select the content of which the occurrence rate of the reproduction delay is lowest and the content of which the reproduction delay time is shortest, make a switchover to the selected content, and reproduce the content.

Further, the content reproduction control means 5 may evaluate the reproduction quality of the content by combining a plurality of the items of the information such as the content reproduction quality information representing these signal qualities, and the content reproduction quality information representing the network quality, select the content evaluated as a content of which the reproduction quality is highest, make a switchover to the selected content, and reproduce the content. For example, the content reproduction control means 5 may select the contents under criteria of giving selection of the content of which the reproduction delay hardly occurs highest priority, and next giving selection of the content of which the image quality and the sound quality are high higher priority. Further, for example, the content of which the image quality and the sound quality are high may be selected from among the contents having the minimum network quality for preventing the reproduction delay from occurring.

Further, for example, when the sections to be included in the common section group exist in a plural number in the to-be-reproduced content, the content reproduction control means 5 may select the content of which the content reproduction quality becomes highest as a whole (synthetically) for a plurality of the sections instead of individually selecting the content of which the content reproduction quality becomes highest for the above sections. This makes it possible to select the content so that the reproduction quality of the content becomes highest as a whole of the content. For example, upon making explanation with FIG. 2 taken as an example, when the to-be-reproduced content is the content 1, the content reproduction control means 5 may select the content of which the content reproduction quality becomes highest as a whole for the section a and the section b to be included in the common section group, instead of individually selecting the content of which the content reproduction quality becomes highest for the section a and the section b.

Figure 3:
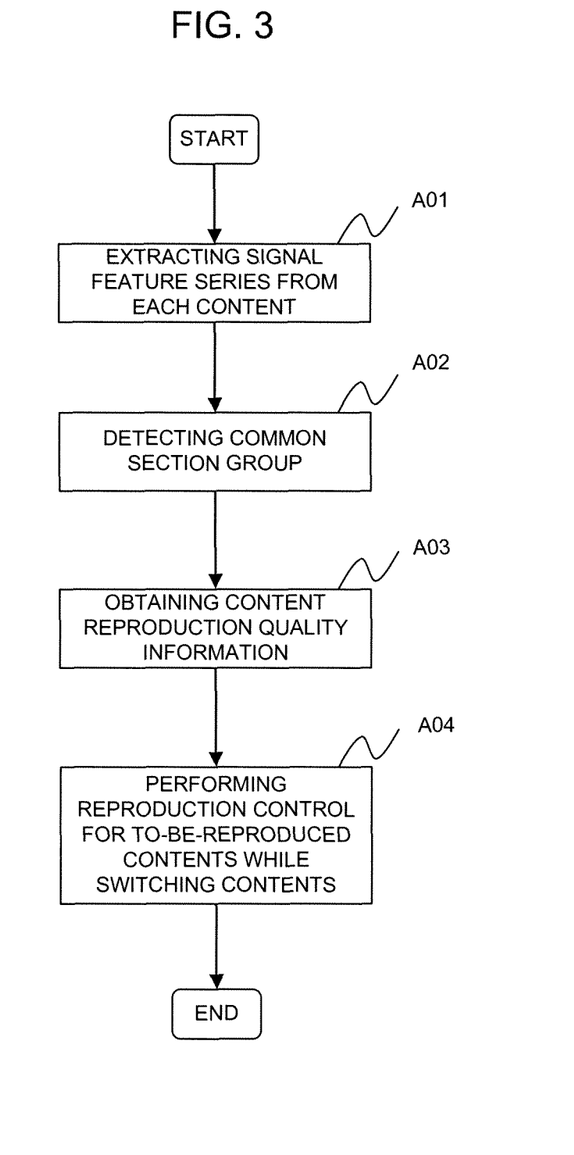
FIG. 3 is a flowchart illustrating an operation of this exemplary embodiment.

Next, an operation of this exemplary embodiment will be explained by utilizing a flowchart of FIG. 3. FIG. 3 is a flowchart illustrating an operation of the content reproduction order determination system in this exemplary embodiment.

At first, the signal feature series extraction means 2, for each content stored in the content group storage unit 1, extracts a signal feature series, being a series of the signal features caused to correspond to positions on the time axis of the content (for example, the media time etc.), and supplies the extracted signal feature series for each content to the common section group detection means 3 (step A01).

Next, the common section group detection means 3 detects a group of the common sections, being sections in which the signal features for different contents are similar to each other, from the signal feature series for each content that are supplied from the signal feature series extraction means 2 as a common section group. The common section group detection means 3 supplies information of the detected common section group, namely, information for specifying the content to which each common section of the common section group belongs and the position on the time axis as common section group information to the content reproduction quality information obtaining means 4 and the content reproduction control means 5 (step A02).

And, the content reproduction quality information obtaining means 4 obtains content reproduction quality information representing a reproduction quality of the content to which each common section of the common section group belongs based upon the common section group information to be supplied from the common section group detection means 3. The content reproduction quality information obtaining means 4 supplies the obtained content reproduction quality information to the content reproduction control means 5 (step A03).

Finally, the content reproduction control means 5, when reproducing the contents to be included in the content group storage unit 1, switches the content to be reproduced so that the reproduction quality of the content becomes higher based upon the content reproduction quality information of the content to which each common section of the common section group belongs, for the sections to be included in the common section group in the to-be-reproduced content by employing the common section group information to be supplied from the common section group detection means 3, and the content reproduction quality information to be supplied from the content reproduction quality information obtaining means 4, and reproduces the content (step A04).

An effect of this exemplary embodiment will be explained.

This exemplary embodiment yields an effect that the reproduction in which the reproduction quality of the content is secured is realized in the system of reproducing/perusing the contents with a large volume of the contents as a target such as the video sharing service (video hosting site) on Internet. This yields an effect that the user can enjoy the viewing of the contents of which the reproduction quality is high, and a possibility that the user resignedly puts up with the viewing of the contents of which the reproduction quality is poor is decreased.

The reason is that the content reproduction control means 5, when reproducing the contents, makes a switchover to the content of which the reproduction quality is high for the sections each having the common section to other contents, based upon the content reproduction quality information obtained by the content reproduction quality information obtaining means 4, and reproduces the content.

In particular, an effect of this exemplary embodiment becomes large because the identical contents having various reproduction qualities or the contents in which only one part of the section is identical exist in a plural number in the video sharing service (video hosting site) on Internet or the like.

Additionally, the present invention targets not only the video sharing service (video hosting site) on Internet, but also a video recording apparatus (a hard disc recorder etc.), a video viewing terminal (a set top box etc.), a mobile video player, and a mobile music player so long as they are systems and apparatuses that reproduce/peruse the contents with a large volume contents as a target.

Further, while each part was configured with hardware in the above-mentioned exemplary embodiment, it may be configured with the information processing apparatus such as CPU that operates under a program. In this case, the program causes CPU etc. to execute the above-described operation.

The first mode of the present invention is characterized in that a content reproduction control system, comprising: a content group storage unit for storing at least one content or more; a signal feature series extraction means for, for each content stored in said content group storage unit, extracting a signal feature series, being a series of signal features caused to correspond to positions on a time axis of the content; a common section group detection means for detecting a group of common sections, being sections in which the signal features for different contents are similar to each other, from said signal feature series for each content as a common section group; a content reproduction quality information obtaining means for, for said each common section group, obtaining content reproduction quality information representing a reproduction quality of the content to which each common section of the common section group belongs; and a content reproduction control means for, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The second mode of the present invention, in the above-mentioned mode, is characterized in that said content is a media having a time axis, said media configured of video signals or audio signals, or both of the video signals and the audio signals.

The third mode of the present invention, in the above-mentioned mode, is characterized in that said signal feature series includes at least one of a feature representing the video signals to be included in the content, and a feature representing the audio signals to be included in the content.

The fourth mode of the present invention, in the above-mentioned mode, is characterized in that said content reproduction quality information obtaining means obtains information representing the reproduction quality of each common section of the common section group as content reproduction quality information.

The fifth mode of the present invention, in the above-mentioned mode, is characterized in that said content reproduction control means, when reproducing the contents stored in said content group storage unit, selects the content of which the content reproduction quality becomes highest based upon said content reproduction quality information of the content to which each common section of said common section group belongs, for the sections to be included in said common section group in the to-be-reproduced contents, makes a switchover to the selected content, and reproduces the content.

The sixth mode of the present invention, in the above-mentioned mode, is characterized in that said content reproduction quality information obtaining means obtains information representing an image quality or a sound quality of the content as the content reproduction quality information, and wherein said content reproduction control means makes a switchover to the content in which either the image quality or the sound quality of at least one common section or more, or both thereof is high, and reproduces the content.

The seventh mode of the present invention, in the above-mentioned mode, is characterized in that said information representing the image quality or the sound quality of the content is information representing one of a bit rate, a resolution, a frame rate, a coding scheme, and a coding noise of the content, or a combination thereof.

The eighth mode of the present invention, in the above-mentioned mode, is characterized in that said content reproduction quality information obtaining means obtains information representing a quality of a network intervening between a location of the content and a user's reproduction environment as the content reproduction quality information, and wherein said content reproduction control means makes a switchover to the content of which the quality of the network intervening between the location of the content and the user's reproduction environment is high and reproduces the content.

The ninth mode of the present invention, in the above-mentioned mode, is characterized in that said information representing the quality of the network is information representing one of a communication band of the network intervening between the location of the content and the user's reproduction environment, a communication delay, a packet loss rate, a traffic amount, a occurrence rate of a reproduction delay, a reproduction delay time, and an access amount to a server, or a combination thereof.

The tenth mode of the present invention is characterized in that a content reproduction control apparatus, comprising: a signal feature series extraction means for, for each content stored in a content group storage unit for storing at least one content or more, extracting a signal feature series, being a series of signal features caused to correspond to positions on a time axis of the content; a common section group detection means for detecting a group of common sections, being sections in which the signal features for different contents are similar to each other, from said signal feature series for each content as a common section group; a content reproduction quality information obtaining means for, for said each common section group, obtaining content reproduction quality information representing a reproduction quality of the content to which each common section of the common section group belongs; and a content reproduction control means for, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The eleventh mode of the present invention is characterized in that a content reproduction control method, comprising: a signal feature series extraction step of, for each content stored in a content group storage unit for storing at least one content or more, extracting a signal feature series, being a series of signal features caused to correspond to positions on a time axis of the content; a common section group detection step of detecting a group of common sections, being sections in which the signal features for different contents are similar to each other, from said signal feature series for each content as a common section group; a content reproduction quality information obtaining step of, for said each common section group, obtaining content reproduction quality information representing a reproduction quality of the content to which each common section of the common section group belongs; and a content reproduction control step of, when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

The twelfth mode of the present invention is characterized in that a content reproduction control program for causing an information processing apparatus to execute: a signal feature series extraction process of, for each content stored in a content group storage unit for storing at least one content or more, extracting a signal feature series, being a series of signal features caused to correspond to positions on a time axis of the content; a common section group detection process of detecting a group of common sections, being sections in which the signal features for different contents are similar to each other, from said signal feature series for each content as a common section group; a content reproduction quality information obtaining process of, for said each common section group, obtaining content reproduction quality information representing a reproduction quality of the content to which each common section of the common section group belongs; and a content reproduction control process of; when reproducing the contents to be included in said content group storage unit, switching the content to be reproduced so that the reproduction quality of the content becomes higher based upon said content reproduction quality information of the content to which each common section of said common section group belongs, for the sections to be included in said common section group in the to-be-reproduced contents, and reproducing the content.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the spirit and scope of the invention.

This application is based upon and claims the benefit of priority from Japanese patent application No. 2008-167342, filed on Jun. 26, 2008, the disclosure of which is incorporated herein in its entirety by reference.

INDUSTRIAL APPLICABILITY

As an example of putting the present invention into practical use, the reproduction in which the reproduction quality is secured (a high reproduction quality) can be presented to the user, for example, in the system of reproducing/perusing the contents with a large volume of the contents as a target such as the video sharing service (video hosting site) on Internet.

The invention claimed is:

1. A content reproduction control system, comprising:
a content group storage that stores a plurality of contents;
a signal feature series extraction unit that, for each content stored in said content group storage, extracts a signal feature series, being a series of signal features caused to correspond to positions on a time axis of the content;
a common section group detector that detects common sections, being sections in which the signal features for different contents of the plurality of contents are similar to each other, groups the detected sections as a common section group based on said signal feature series for each content of the plurality of contents, and generates common section group information for specifying the content to which each common section of the common section group belongs and the position on the time axis of each common section of the common section group;
a content reproduction quality information obtaining unit that, for said each common section group, obtains content reproduction quality information representing a reproduction quality of the content in each common section of the common section group based on the common section group information; and
a content reproduction controller that, when reproducing a content of the plurality of contents along a time axis, which is stored in said content group storage:
selects, in the common sections of to-be-reproduced content, a common section in which a reproduction quality is the greatest out of common sections in the common section group to which the common section belongs based on the common section group information;
in the common sections of the to-be-reproduced content, makes a switchover to the content corresponding to the selected common section and reproduces the content; and
in sections other than the common sections of the to-be-reproduced content, reproduces the to-be-reproduced content.

2. A content reproduction control system according to claim 1, wherein said content comprises a media having a time axis, said media configured of video signals or audio signals, or both of the video signals and the audio signals.

3. A content reproduction control system according to claim 1, wherein said signal feature series includes at least one of a feature representing the video signals to be included in the content, and a feature representing the audio signals to be included in the content.

4. A content reproduction control system according to claim 1, wherein said content reproduction quality information obtaining unit obtains information representing the reproduction quality of each common section of the common section group as content reproduction quality information.

5. A content reproduction control system according to claim 1, wherein said content reproduction controller, when reproducing the contents stored in said content group storage, selects the content of which the content reproduction quality becomes highest based upon said content reproduction quality information of the content to which each common section of said common section group belongs, for the sections to be included in said common section group in the to-be-reproduced contents, makes a switchover to the selected content, and reproduces the content.

6. A content reproduction control system according to claim 1, wherein said content reproduction quality information obtaining unit obtains information representing an image quality or a sound quality of the content as the content reproduction quality information, and wherein said content reproduction controller makes a switchover to the content in which either the image quality or the sound quality of at least one common section or more, or both thereof is high, and reproduces the content.

7. A content reproduction control system according to claim 6, wherein said information representing the image quality or the sound quality of the content comprises information representing one of a bit rate, a resolution, a frame rate, a coding scheme, and a coding noise of the content, or a combination thereof.

8. A content reproduction control system according to claim 1, wherein said content reproduction quality information obtaining unit obtains information representing a quality of a network intervening between a location of the content and a user's reproduction environment as the content reproduction quality information, and wherein said content reproduction controller makes a switchover to the content of which the quality of the network intervening between the location of the content and the user's reproduction environment is high and reproduces the content.

9. A content reproduction control system according to claim 8, wherein said information representing the quality of the network comprises information representing one of a communication band of the network intervening between the location of the content and the user's reproduction environment, a communication delay, a packet loss rate, a traffic amount, an occurrence rate of a reproduction delay, a reproduction delay time, and an access amount to a server, or a combination thereof.

10. A content reproduction control system according to claim 1, wherein the content reproduction controller continuously reproduces the selected content.

11. A content reproduction control system according to claim 1, wherein the common sections comprise sections in which the signal features for different contents are identical to each other.

12. A content reproduction control system according to claim 1, wherein the content reproduction quality information comprises plural items of information, and the content reproduction controller selects the content to be reproduced based upon the plural items of information.

13. A content reproduction control system according to claim 1, wherein the system comprises a video hosting website which is stored on a server connected to the Internet.

14. A content reproduction control system according to claim 13, wherein the content reproduction controller reproduces the selected content to be viewable a plurality of user terminals which are connected to the server via the Internet.

15. A content reproduction control system according to claim 1, wherein the content reproduction quality information obtaining unit:
obtains information representing an image quality or a sound quality of the content as the content reproduction quality information, the information representing the image quality or the sound quality of the content comprising information representing one of a bit rate, a resolution, a frame rate, a coding scheme, and a coding noise of the content, or a combination thereof.

16. A content reproduction control system according to claim 1, wherein the content reproduction quality information obtaining unit:
obtains information representing a quality of a network intervening between a location of the content and a user's reproduction environment as the content reproduction quality information, the information representing the quality of the network comprising information representing one of a communication band of the network intervening between the location of the content and the user's reproduction environment, a communication delay, a packet loss rate, a traffic amount, an occurrence rate of a reproduction delay, a reproduction delay time, and an access amount to a server, or a combination thereof.

17. A content reproduction control apparatus, comprising:
a signal feature series extraction unit that, for each content stored in a content group storage unit for storing a plurality of contents, extracts a signal feature series, being a series of signal features caused to correspond to positions on a time axis of the content;
a common section group detector that detects common sections, being sections in which the signal features for different contents of the plurality of contents are similar to each other, groups the detected sections as a common section group based on said signal feature series for each content of the plurality of contents, and generates common section group information for specifying the content to which each common section of the common section group belongs and the position on the time axis of each common section of the common section group;
a content reproduction quality information obtaining unit that, for said each common section group, obtains content reproduction quality information representing a reproduction quality of the content in each common section of the common section group based on the common section group information; and
a content reproduction controller that, when reproducing a content of the plurality of contents along a time axis, which is stored in said content group storage:
selects, in the common sections of to-be-reproduced content, a common section in which a reproduction quality is the greatest out of common sections in the common section group to which the common section belongs based on the common section group information;
in the common sections of the to-be-reproduced content, makes a switchover to the content corresponding to the selected common section and reproduces the content; and
in sections other than the common sections of the to-be-reproduced content, reproduces the to-be-reproduced content.

18. A content reproduction control method, comprising:
a signal feature series extraction of, for each content stored in a content group storage unit for storing a plurality of contents, extracting a signal feature series, being a series of signal features caused to correspond to positions on a time axis of the content;
a common section group detection of detecting common sections, being sections in which the signal features for different contents of the plurality of contents are similar to each other, grouping the detected sections as a common section group based on said signal feature series for each content of the plurality of contents, and generating common section group information for specifying the content to which each common section of the common section group belongs and the position on the time axis of each common section of the common section group;

a content reproduction quality information obtaining of, for said each common group, content reproduction quality information representing a reproduction quality of the content in each common section of the common section group based on the common section group information; and a content reproduction control of, when reproducing a content of the plurality of contents along a time axis, which is stored in the content group storage:

selecting, in the common sections of to-be-reproduced content, a common section in which a reproduction quality is the greatest out of common sections in the common section group to which the common section belongs based on the common section group information;

in the common sections of the to-be-reproduced content, making a switchover to the content corresponding to the selected common section and reproducing the content; and in sections other than the common sections of the to-be-reproduced content, reproducing the to-be-reproduced content.

19. A non-transitory computer readable storage medium storing a content reproduction control program for causing an information processing apparatus to execute:

a signal feature series extraction process of, for each content stored in a content group storage unit for storing a plurality of contents, extracting a signal feature series, being a series of signal features caused to correspond to positions on a time axis of the content;

a common section group detection process of detecting common sections, being sections in which the signal features for different contents of the plurality of contents are similar to each other, grouping the detected sections as a common section group based on said signal feature series for each content of the plurality of contents, and generating common section group information for specifying the content to which each common section of the common section group belongs and the position on the time axis of each common section of the common section group;

a content reproduction quality information obtaining process of, for said each common section group, obtaining content reproduction quality information representing a reproduction quality of the content in each common section of the common section group based on the common section group information; and a content reproduction control process of, when reproducing a content of the plurality of contents along a time axis, which is stored in the content group storage:

selecting, in the common sections of to-be-reproduced content, a common section in which a reproduction quality is the greatest out of common sections in the common section group to which the common section belongs based on the common section group information;

in the common sections of the to-be-reproduced content, making a switchover to the content corresponding to the selected common section and reproducing the content; and in sections other than the common sections of the to-be-reproduced content, reproducing the to-be-reproduced content.

* * * * *